United States Patent [19]
Ermacora et al.

[11] Patent Number: 5,901,533
[45] Date of Patent: May 11, 1999

[54] AGRICULTURAL MACHINE

[75] Inventors: Rino Ermacora, St Jean Saverne; Martin Walch, Dettwiller; Bernard Wattron, Haegen, all of France

[73] Assignee: Kuhn, S.A., Saverne Cedex, France

[21] Appl. No.: 08/835,530

[22] Filed: Apr. 8, 1997

[30] Foreign Application Priority Data

Apr. 9, 1996 [FR] France .................................. 96 04548

[51] Int. Cl.⁶ .......................... A01D 34/66; A01D 34/82
[52] U.S. Cl. ................................... 56/6; 56/11.9; 56/15.1
[58] Field of Search .................................. 56/11.9, 15.2, 56/15.1, 15.7, 15.5, 6, 16.7, 255, 295; 180/53.4; 280/419, 442

[56] References Cited

U.S. PATENT DOCUMENTS

| | | | |
|---|---|---|---|
| 5,060,462 | 10/1991 | Helfer et al. ........................ | 56/15.5 X |
| 5,136,828 | 8/1992 | Ermacora .............................. | 56/15.5 X |
| 5,179,822 | 1/1993 | McLean ............................... | 56/6 |
| 5,272,859 | 12/1993 | Pruitt et al. ............................ | 56/15.2 |
| 5,345,752 | 9/1994 | Pruitt et al. ............................ | 56/6 |
| 5,433,064 | 7/1995 | Schmitt et al. ........................ | 56/6 |

*Primary Examiner*—Heather Shackelford
*Attorney, Agent, or Firm*—Oblon, Spivak, McClelland, Maier & Neustadt, P.C.

[57] ABSTRACT

An agricultural machine includes a body, a connecting mechanism, an operating device for pivoting the connecting mechanism into at least two working positions, transmission elements which include at least one gearbox, and a control mechanism intended to pivot the gearbox into operating positions corresponding to the working positions of the connecting mechanism. In accordance with the invention, the control mechanism is installed, among others, between the gearbox and the operating device. This control mechanism can also include a first control cylinder installed between the connecting mechanism and the body and connected in series to a second control cylinder installed between the body and the gearbox.

14 Claims, 11 Drawing Sheets

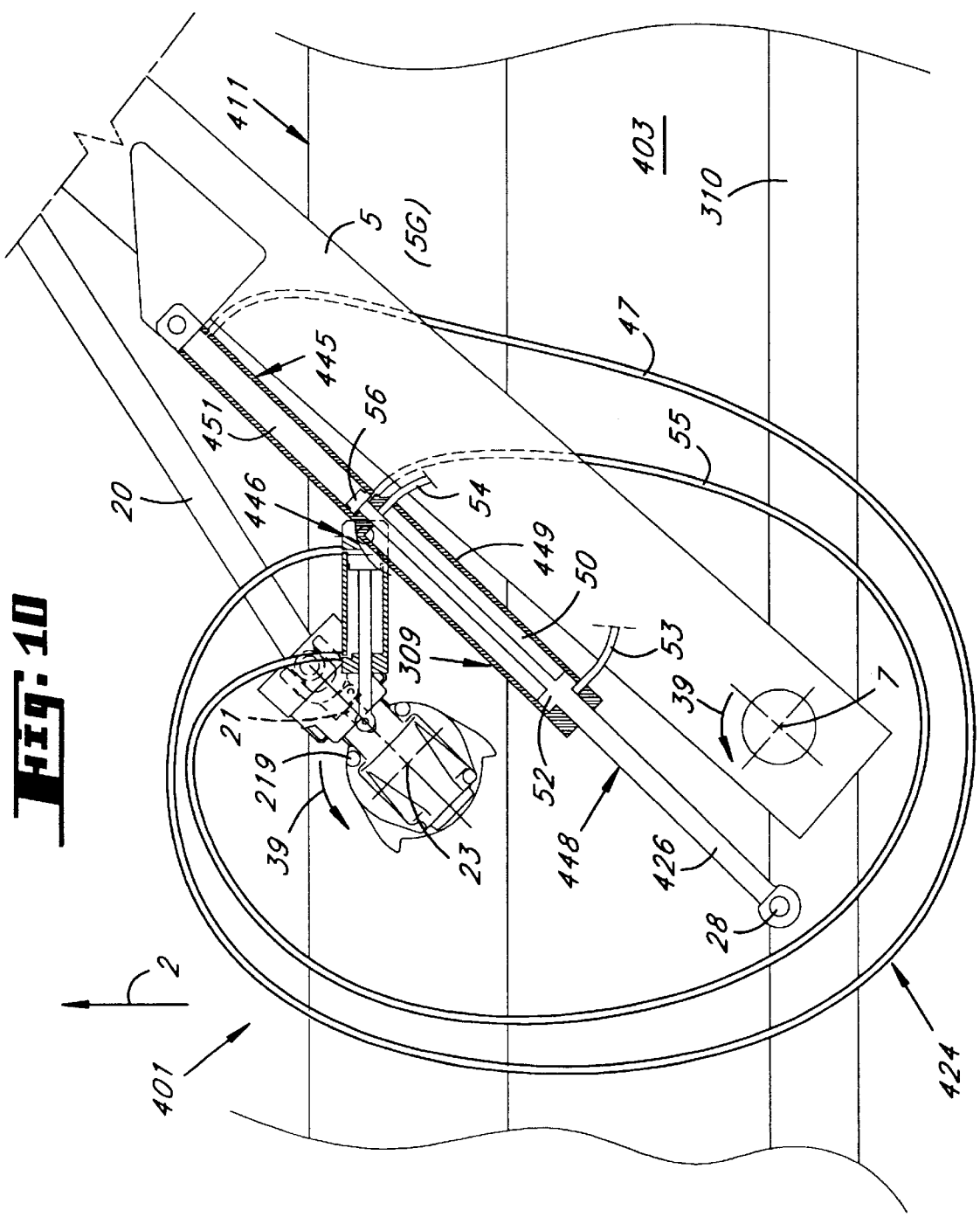

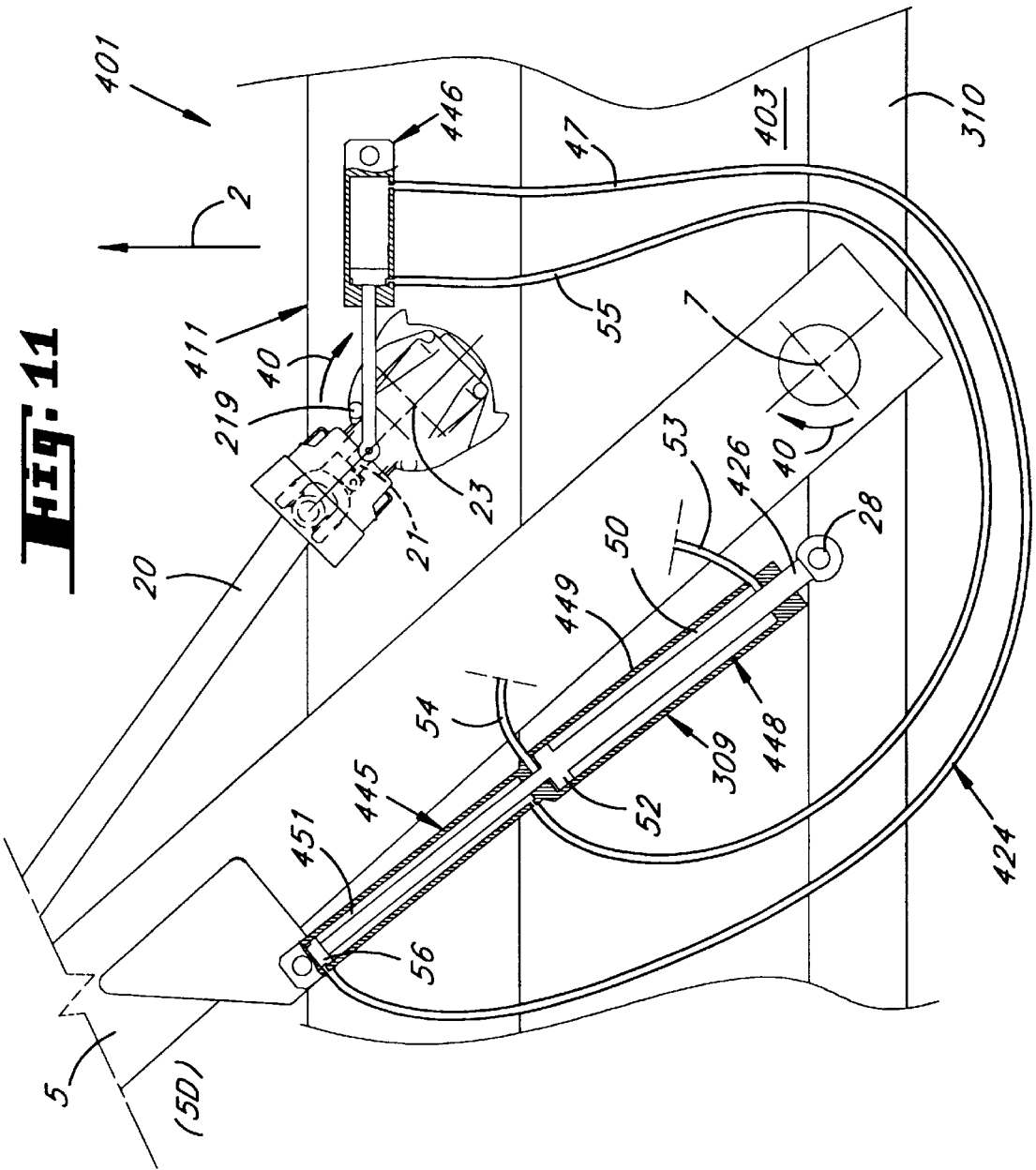

AGRICULTURAL MACHINE

BACKGROUND OF THE INVENTION

1. Field of the Invention

The present invention regards an agricultural machine comprising:

- a body equipped with at least one working component;
- a connecting mechanism allowing connection of said agricultural machine to a tractor, said connecting mechanism being connected to said body by a first joint with an upwardly directed axis;
- an operating device for pivoting the connecting mechanism with respect to said body around the axis of said first joint, said connecting mechanism being positionable in at least two working positions;
- transmission elements for powering said at least one working component, said transmission elements comprising at least one gearbox connected to the body by a second joint with an upwardly directed axis; and
- a control mechanism for pivoting said gearbox with respect to the body around the axis of said second joint wherein the gearbox is positionable in operating positions that correspond to said working positions of the connecting mechanism.

2. Discussion of the Background

An agricultural machine is described in document EP 0 277 343 A1 and comprises a mower-conditioner. First, this known machine comprises a body that consists of a chassis that moves over the ground via two wheels, and a harvesting device suspended in the chassis by means of a drawn deformable quadrilateral suspension device. This known machine also includes a drawbar allowing it to be connected to a tractor. This drawbar is connected to the midsection of the chassis by means of a joint whose axis is roughly vertical so that it can occupy at least two working positions by pivoting around said axis. The harvesting device itself comprises a carrying structure carrying cutting drums and a conditioning rotor installed behind them.

This known machine additionally comprises transmission elements designed to power the cutting drums and the conditioning rotor. These transmission elements consist primarily of a transmission device installed in the front part of the drawbar that is designed to receive the movement from the power take-off shaft of the tractor via a first telescopic transmission shaft with universal joints. These transmission elements also consist of a gearbox connected to the carrying structure of the harvesting mechanism by means of a joint whose axis is roughly parallel to the axis of the joint connecting the drawbar to the chassis. This gearbox receives the movement of the transmission device output shaft via a second telescopic transmission shaft with universal joints. The output shaft of the gearbox transmits the movement to the drive components of the harvesting device.

The axis of the joint connecting the gearbox to the carrying structure of the harvesting mechanism is located in the vertical plane pointing in the direction of displacement and enclosing the axis of the joint connecting the drawbar to the chassis, and is located in front of this latter axis. As a result, it is possible to swivel said gearbox around the axis of its joint when the drawbar is pivoted into its various positions so that the input shaft of the gearbox is always pointing towards the front of the drawbar. To this end, this known machine comprises a control mechanism that consists of a coupling. This coupling comprises a first forked coupling that is guided in rotation between the two universal joints of the second telescopic transmission shaft and a second forked coupling mounted on the gearbox and inside which the input shaft of said gearbox is guided in rotation. These two forked couplings are connected to each other by a joint with an approximately horizontal axis that passes through the center of the universal joint of the second telescopic transmission shaft located beside the input shaft of the gearbox.

In this known machine, the position of the gearbox is controlled via the second telescopic transmission shaft in response of the swiveling of the drawbar. Additionally, the joint connecting the two forked couplings enables the harvesting mechanism to move with respect to the chassis in order to adjust to the ground terrain.

The control mechanism used on this known machine has several disadvantages. It first requires a special telescopic transmission shaft with universal joints since the first forked coupling is guided in rotation thereon by means of two bearings. Assembly then requires that relatively strict machining tolerances be observed since the axis of the joint connecting the two forked couplings together must pass precisely through the center of the universal joint of the second telescopic transmission shaft located beside the input shaft of the gearbox.

U.S. Pat. No. 5,272,859 presents another mower-conditioner comparable to the one described in EP 0 277 343 A1. The control mechanism, which is designed to pivot the gearbox to position it properly according to the position of the drawbar, is made up of a telescopic control rod located between the drawbar and the gearbox. This telescopic control rod comprises an inner section connected to the drawbar by means of a ball and socket joint and capable of sliding inside an outer section connected indirectly to the gearbox. At its end beside the gearbox, the outer section of the telescopic control rod has two lugs between which extends a rigid tubular housing that is part of the gearbox. Said lugs are connected to the said housing by means of a joint with a roughly horizontal axis that passes through the center of the universal joint of the second telescopic transmission shaft located next to the gearbox.

In this known machine, the position of the gearbox is controlled via the telescopic control rod in response of pivoting of the drawbar. Moreover, the fact that the telescopic control rod can lengthen and shorten combined with the pivoting enabled by the joint connecting said rod to the gearbox allows the harvesting mechanism to move with respect to the chassis in order to adapt itself to the ground.

In order to allow the inner section to slide easily inside the outer section, it is necessary to provide sufficient play between these two sections. Under these conditions, absorption of the driving torque applied to the gearbox causes the telescopic control rod to bend. This can slow the shortening of the telescopic control rod during the harvesting mechanism's adjustment to the ground contours. Additionally, the lengthening and shortening of the telescopic control rod under a large load risks causing relatively rapid wear of said rod.

EP 0 678 237 A1 describes a mower that primarily comprises a body consisting of a chassis that moves over the ground via two wheels and a cutting mechanism suspended from the chassis by means of a suspension device that allows the cutting mechanism to move with respect to said chassis in order to adapt itself to the ground contours. This mower also has a drawbar making it possible to connect it to a tractor. This drawbar is connected to the mid-section of the chassis by means of a joint with an approximately vertical axis so that it can occupy at least two working positions by swiveling around said axis.

This known mower also comprises transmission elements designed to power the cutting tools. These transmission elements consist first of all of an upper gearbox mounted on the drawbar and whose input shaft receives the motion of the output shaft of a transmission device installed in the front part of the drawbar via a telescopic transmission shaft with universal joints. The output shaft of this upper gearbox extends in a roughly parallel fashion to the axis of the joint connecting the drawbar to the chassis. This output shaft is coaxial with the input shaft of the lower gearbox, whose output shaft is connected to the drive components of the cutting mechanism via another telescopic transmission shaft with universal joints.

The lower gearbox is thus borne by the upper gearbox so that it is capable of swiveling around the common axis of the output shaft of the upper gearbox and the input shaft of the lower gearbox. During pivoting of the drawbar, the position of the lower gearbox is controlled by a guiding mechanism. In a first embodiment, this guiding mechanism consists of a rod installed between the lower gearbox and the cutting mechanism, roughly parallel to the transmission shaft connecting the output shaft of said lower gearbox to the drive components of the cutting mechanism. In a second embodiment, the guiding mechanism consists of a deformable parallelogram connected to the chassis.

In this known mower, the position of the lower gearbox is controlled via the upper gearbox during the swiveling of the drawbar. This solution is relatively expensive since it requires two gearboxes capable of pivoting with respect to each other.

SUMMARY OF THE INVENTION

The aim of the present invention is to propose another solution without the disadvantages of the known solutions.

To this end, a first agricultural machine in accordance with the invention is characterized in that the control mechanism for positioning the gearbox is installed, among others, between said gearbox and the operating device for pivoting the connecting mechanism with respect to the body of the machine.

In this manner, the gearbox is brought into the appropriate operating position when the operating device brings the connecting mechanism into any one of its various working positions.

In this first agricultural machine, in accordance with the invention, the position of the gearbox is not controlled by the connecting mechanism itself, but, among others, by the operating device intended to bring the connecting mechanism into its various working positions.

The invention also regards the characteristics hereinafter considered separately or in all their technically possible combinations.

In a first group of embodiments, said control mechanism comprises a cable connected between the operating device and the gearbox.

This cable can pass through a sleeve and control the pivoting of the gearbox in one direction only, while the control mechanism will consist in addition of a flexible control component installed between the body and the gearbox that controls the pivoting of said gearbox in the other direction. In this case, it may advantageously be provided that the reaction generated by the driving torque applied to the gearbox tends to cause said gearbox to pivot in the same direction as the flexible control component does. It may also be advantageous to provide that the operating device acts on the cable by means of a flexible element, preferably a compression element.

However, it can also be provided that the cable constitutes a closed loop that passes through two half-sleeves installed on the body. In this case, the cable will control the pivoting of the gearbox in both directions.

Also, the sleeve or the two half-sleeves may be advantageously compressed by a flexible compression element.

When the operating device comprises an operating cylinder positioned between the connecting mechanism and the body, the cable can also be connected advantageously to said cylinder near the joint connecting the cylinder to the body. To this end, the operating cylinder may advantageously include an extension that extends beyond the joint connecting said cylinder to the body and to which the cable will be connected.

In a second group of embodiments, said control mechanism comprises an articulated rod assembly. This rod assembly can consist of a lever attached to the body, a first rod installed between the operating device and said lever, and a second rod installed between said lever and the gearbox. In this case, said lever may be attached by one of its ends to the body, said second rod may be attached to the other end of said lever and said first rod may be attached to said lever between its two ends.

When the operating device includes an operating cylinder positioned between the connecting mechanism and the body, the rod assembly can be advantageously connected to said cylinder near the joint connecting the cylinder to the body as well. Said cylinder can then also comprise an extension that extends beyond said joint and to which the rod assembly will be connected.

A second agricultural machine in accordance with the invention is characterized in that the control mechanism for positioning the gearbox comprises:

a first control cylinder installed between the connecting mechanism and the body, and a second control cylinder installed between the body and the gearbox and connected in series to the first control cylinder.

The invention also regards the characteristics hereinafter considered separately or in all their technically possible combinations.

The first control cylinder and the second control cylinder can be of a single-action type. The second control cylinder will thus control the pivoting of the gearbox in one direction, while the control mechanism will also comprise a flexible control component installed between the body and the gearbox that controls the pivoting of said gearbox in the other direction. There too, it will be advantageous that the reaction generated by the driving torque applied to the gearbox tends to cause said gearbox to pivot in the same direction as the flexible control component does.

When the operating device comprises an operating cylinder positioned between the connecting mechanism and the body, this operating cylinder and the first control cylinder can form a unit positioned between the connecting mechanism and the body. This unit can comprise a cylinder body equipped with an operating chamber as well as a control chamber, and a rod equipped with an operating piston that extends into the operating chamber to form with it the operating cylinder, said rod further extending into the control chamber to form with it the first control cylinder.

However, it is, of course, entirely possible that the first control cylinder and the second control cylinder be of a dual-action type and be connected in a closed circuit.

When the operating device comprises an operating cylinder positioned between the connecting mechanism and the body, this operating cylinder and the first control cylinder can here too form a unit articulated between the connecting mechanism and the body. This unit can comprise a cylinder body equipped with an operating chamber and a control chamber, and a rod equipped with an operating piston that extends into the operating chamber to form with it the operating cylinder, said rod further comprising a control piston extending into the control chamber to form with it the first control cylinder.

In each of these two agricultural machines, according to the invention, it can be provided that the gearbox occupies two operating positions, each defined by a respective stop device installed on the body.

Finally, the invention also regards the following characteristics considered in all their technically possible combinations with the previous characteristics:

the operating cylinder is a dual-action cylinder;

the transmission elements comprise at least one telescopic transmission shaft with universal joints connected to the input shaft of the gearbox;

said at least one transmission shaft or at least one of said transmission shafts is supported by the connecting mechanism;

the transmission elements receive the movement of the power take-off shaft of the tractor vehicle to which the agricultural machine is intended to be connected;

the body rests on the ground by means of at least one wheel, and the connecting mechanism consists of a drawbar connected to the midsection of said body;

the body comprises a chassis to which the connecting mechanism is connected and in which is (are) suspended the working component(s) by means of a suspension device that makes it possible for it (them) to move with respect to the chassis in order to adapt to the ground terrain.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein:

FIG. 10 shows a fifth embodiment of said control mechanism in the left mowing position; and FIG. 11 shows the control mechanism of FIG. 10 in the right mowing position.

DESCRIPTION OF THE PREFERRED EMBODIMENTS

Figure 1:
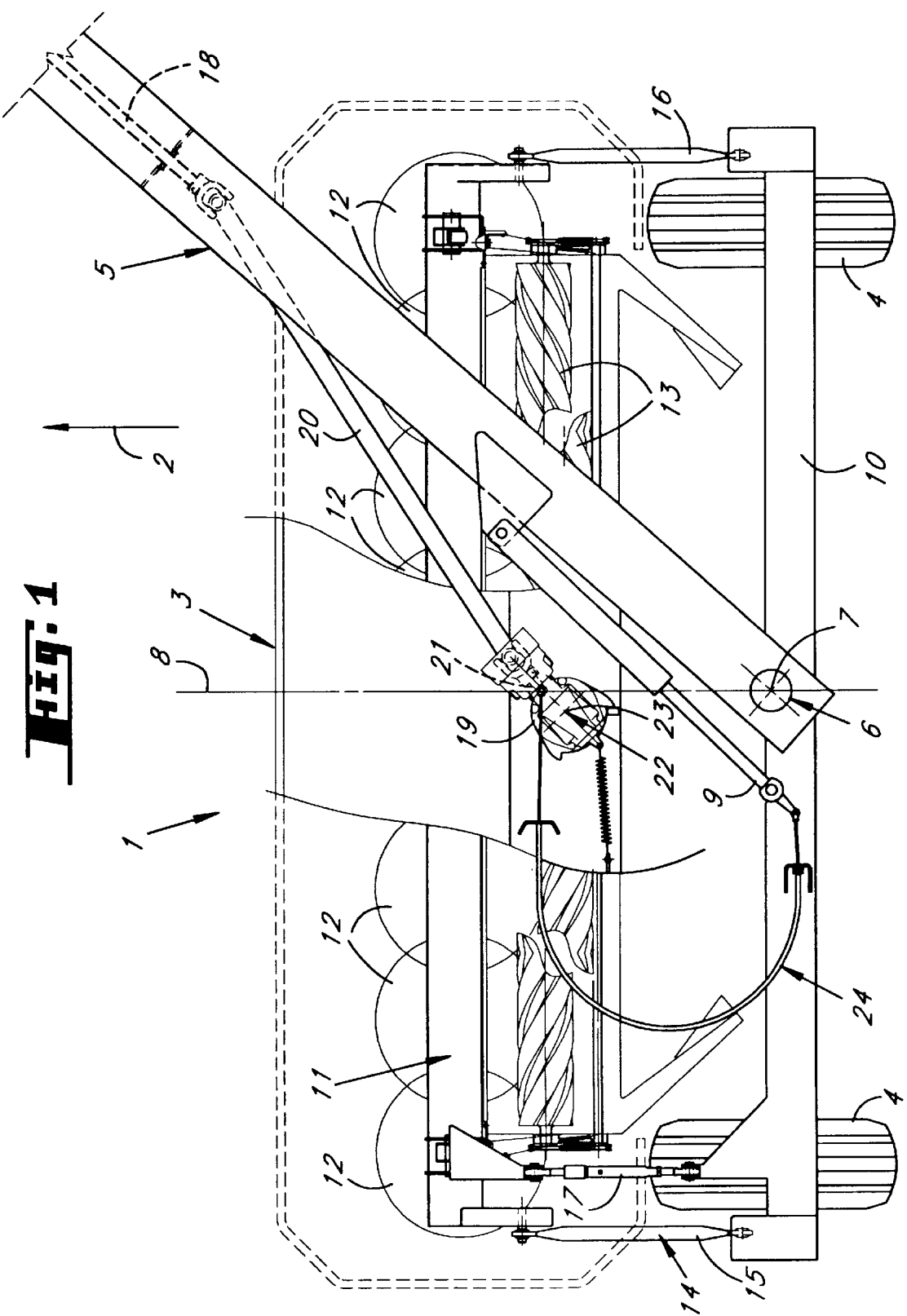
FIG. 1 shows a top view of an agricultural machine according to the invention.
Figure 2:
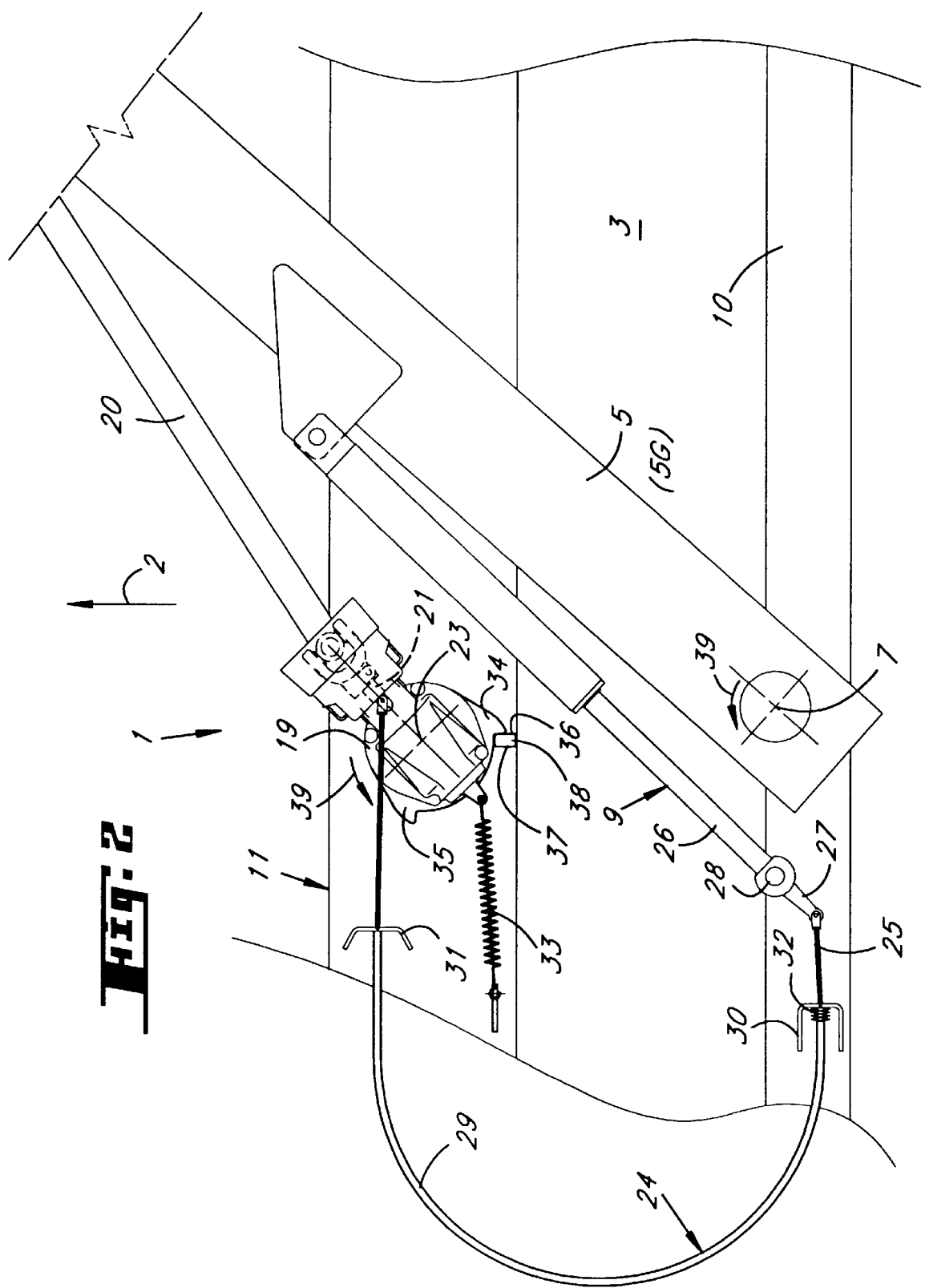
FIG. 2 shows the control mechanism for positioning the gearbox of the agricultural machine in the left mowing position.
Figure 3:
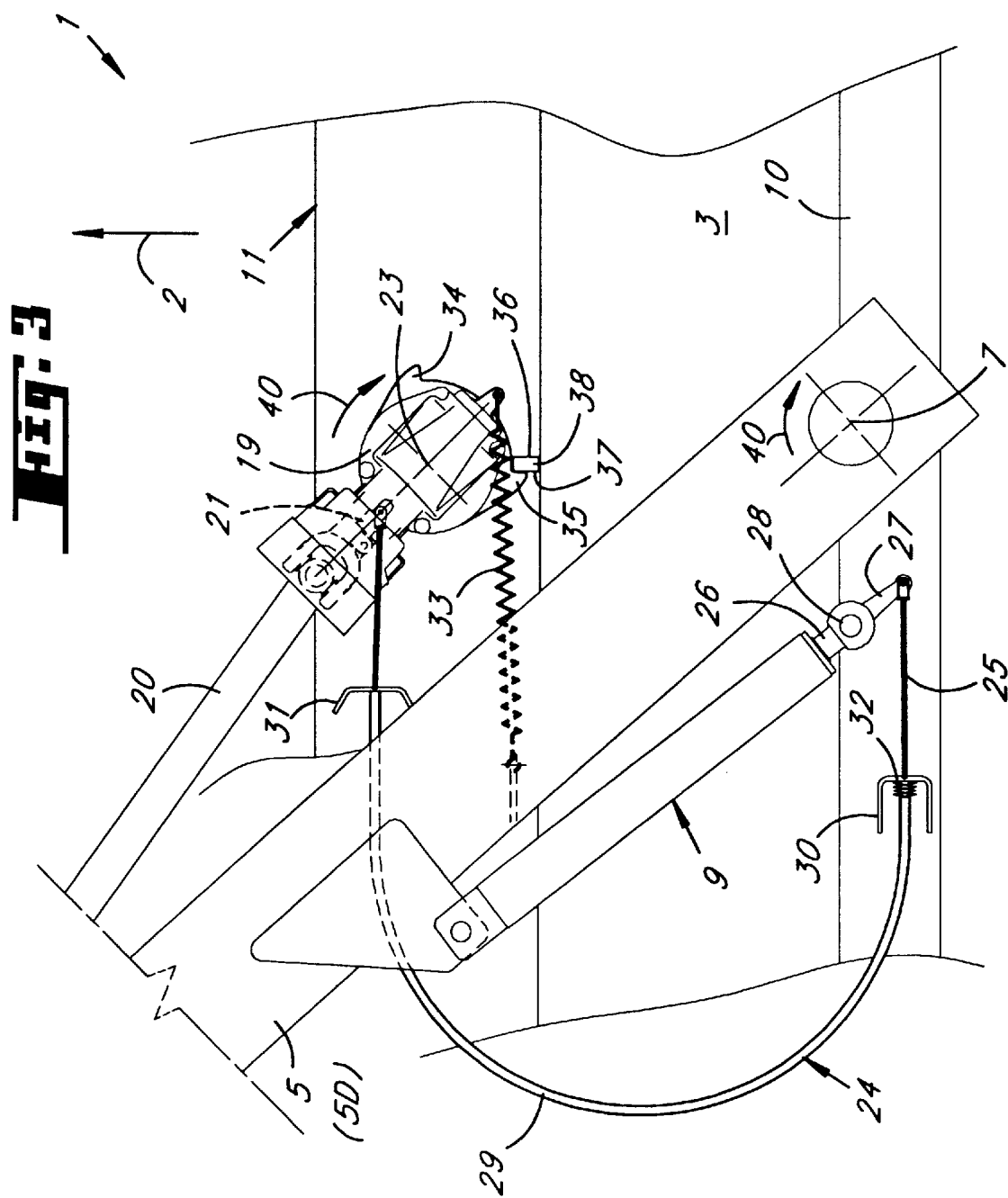
FIG. 3 shows said control mechanism in the right mowing position.

FIGS. 1 to 3 show an agricultural machine, according to the invention, embodied in the form of a mower-conditioner 1. It is hitched to a tractor (not shown) which, during use, pulls it in a forward direction 2.

In the description, the following notions "forward", "rearward", "in front of" and "behind" are defined with respect to this forward direction 20 The notions "right" and "left" are defined by looking at the mower-conditioner 1 from behind in the forward direction 2.

This mower-conditioner consists of a body 3 that moves along the ground via two wheels 4, and a drawbar 5 intended to be connected at its front end to said tractor in a manner known to a person skilled in the art. Moreover, said drawbar 5 is connected at its rear end to the body 3 by means of a joint 6 with a geometrical axis 7 pointing upward (in the example shown, this geometrical axis 7 is roughly vertical and extends roughly in the vertical median plane 8 of the body 3 which is oriented in the direction of forward movement 2.) The angular position of the drawbar 5 with respect to the body 3 can be modified by causing the drawbar 5 to pivot around the geometric axis 7 of the joint 6. Putting the drawbar 5 into the desired angular position and holding the drawbar 5 in the latter are achieved by a hydraulic operating cylinder 9 located between the drawbar 5 and the body 3. As a result of this arrangement, the body 3 of the mower-conditioner 1 can, particularly during work, extend to the left (FIGS. 1 and 2) or to the right (FIG. 3) of the tractor. This enables mowing in both directions of travel.

The body 3 of the mower-conditioner 1 firstly comprises a chassis 10 that rests on the ground by means of two wheels 4 which each extend near one respective outer end of said chassis 10. The body 3 of the mower-conditioner 1 also comprises a harvesting mechanism 11 equipped with cutting components 12 and processing components 13 for the product cut by the cutting components 12 (in the example shown, the cutting components 12 consist of rotating disks, and the processing components 13 consist of a pair of counterrotating conditioning rollers; such disks and conditioning rollers being known to a person skilled in the art). This harvesting mechanism 11 is connected to the chassis 10 by means of a suspension device 14 consisting in the example shown of three suspension rods 15, 16, 17: two lower suspension rods 15, 16 and one upper suspension rod 17. These three suspension rods 15, 16, 17 form a deformable quadrilateral with the chassis 10 and the harvesting mechanism 11 that allows the harvesting mechanism 11 to move essentially up and down with respect to the chassis 10 in order to adapt itself to the ground terrain independently of said chassis 10.

The harvesting mechanism 11 is powered, for example, by means of the power take-off shaft of the tractor vehicle in a manner known to a person skilled in the art. The movement thus arrives via a shaft 18 supported by the drawbar 5 and is transmitted to a gearbox 19 by a telescopic transmission shaft 20 with universal joints installed between said shaft 18 and the input shaft 21 of the gearbox 19. This gearbox 19 is connected to the harvesting mechanism 11 and transmits the movement to the drive components of the cutting components 12 and the processing components 13, not shown, but within the understanding of one skilled in the art.

The gearbox 19 is connected to the harvesting mechanism 11 by means of a joint 22 whose geometric axis 23 points upward (in the example shown, this axis 23 is roughly parallel to the axis 7 and extends in front of this axis 7; moreover, it extends slightly to the left of the median vertical plane 8). Thanks to this joint 22, the input shaft 21 of the gearbox 19 is always oriented toward the front end of the drawbar 5 regardless of the angular position of this drawbar 5. Positioning and maintenance of the gearbox 19 in the appropriate angular position are accomplished by a control mechanism 24.

This control mechanism 24 firstly comprises a cable 25 connected between the operating cylinder 9 and the gearbox 19. To this end, the rod 26 of the operating cylinder 9 comprises an extension 27 that extends beyond the joint 28 connecting the operating cylinder 9 to the chassis 10 of the body 3. Said cable 25 also passes through a sleeve 29 that extends between two stop devices 30, 31 and is compressed by a flexible element 32. In the example shown, one of these stop devices 30, 31 is part of the chassis 10, while the other stop device 31 is part of the harvesting mechanism 11.

This control mechanism 24 also comprises a flexible control component 33 located between the harvesting mechanism 11 and the gearbox 19. In the example shown, this flexible control component 33 consists of a draw spring.

Finally, the gearbox 19 also comprises two lugs 34, 35 that are designed to come into contact with the respective faces 36, 37 of a stop device 38. Each of these faces 36, 37 of the stop device 38 thus constitutes a stop.

Positioning the gearbox 19 into the appropriate operating position is accomplished in the following manner.

To move from the mowing position on the left of the tractor vehicle (FIGS. 1 and 2) to the mowing position on the right (FIG. 3) one shortens the operating cylinder 9 to make the drawbar 5 pivot in one direction 39 around the geometric axis 7 from working position 5G into working position 5D. By so doing, the extension 27 of the operating cylinder 9 pulls the cable 25 and causes the gearbox 19 to pivot in the same direction 39 around the geometric axis 23. When the drawbar 5 reaches its working position 5D, the lug 35 of the gearbox 19 is in contact with the face 37 of the stop device 38. The flexible element 32 allows the lug 35 to be in contact with the stop device 38 when the drawbar 5 reaches its position 5D. In parallel fashion, pivoting the gearbox 19 in this direction 39 stresses the flexible control component 33, which thereby accumulates energy.

To move from the mowing position on the right of the tractor vehicle (FIG. 3) to the mowing position on the left (FIGS. 1 and 2), one lengthens the operating cylinder 9 to cause the drawbar 5 to pivot in the other direction 40 around the geometric axis 7 from working position 5D into working position 5G. In so doing, the extension 27 of the operating cylinder 9 no longer pulls on the cable 25, and it is the flexible control component 33 that will cause the gearbox 19 to pivot in the same direction 40 around the geometric axis 23. When the drawbar 5 reaches its working position 5G, the lug 34 of the gearbox 19 is in contact with the face 36 of the stop device 38, and it is kept in this position by the flexible control component 33. In parallel fashion, the reaction generated by the driving torque applied to the gearbox 19 also tends to cause the gearbox 19 to pivot in this direction 40 and thus assists the flexible control component 33 in keeping the lug 34 of the gearbox 19 in contact with the face 36 of the stop device 38.

The embodiments shown in FIGS. 4 to 11 comprise a certain number of elements that have been previously described. These elements will consequently retain the same reference numbers and will not be described again. They also comprise a certain number of elements that are comparable to elements in the mower-conditioner of the preceding example. These elements will be indicated by the same reference number as these comparable elements of the preceding example increased by one hundred (FIGS. 4 and 5), by two hundred (FIGS. 6 and 7), by three hundred (FIGS. 8 and 9) and by four hundred (FIGS. 10 and 11).

Figure 4:
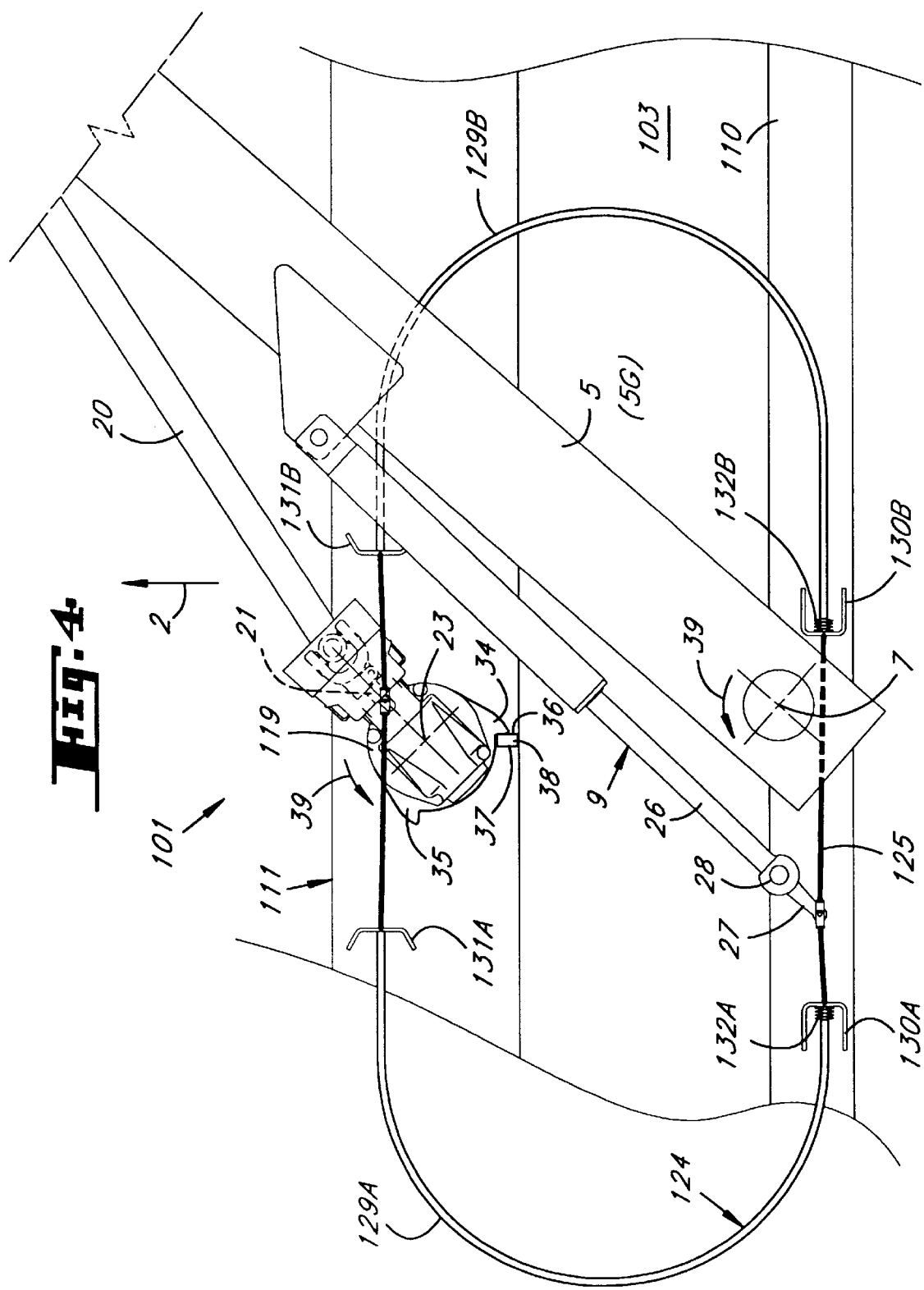
FIG. 4 shows a second embodiment of said control mechanism in the left mowing position.
Figure 5:
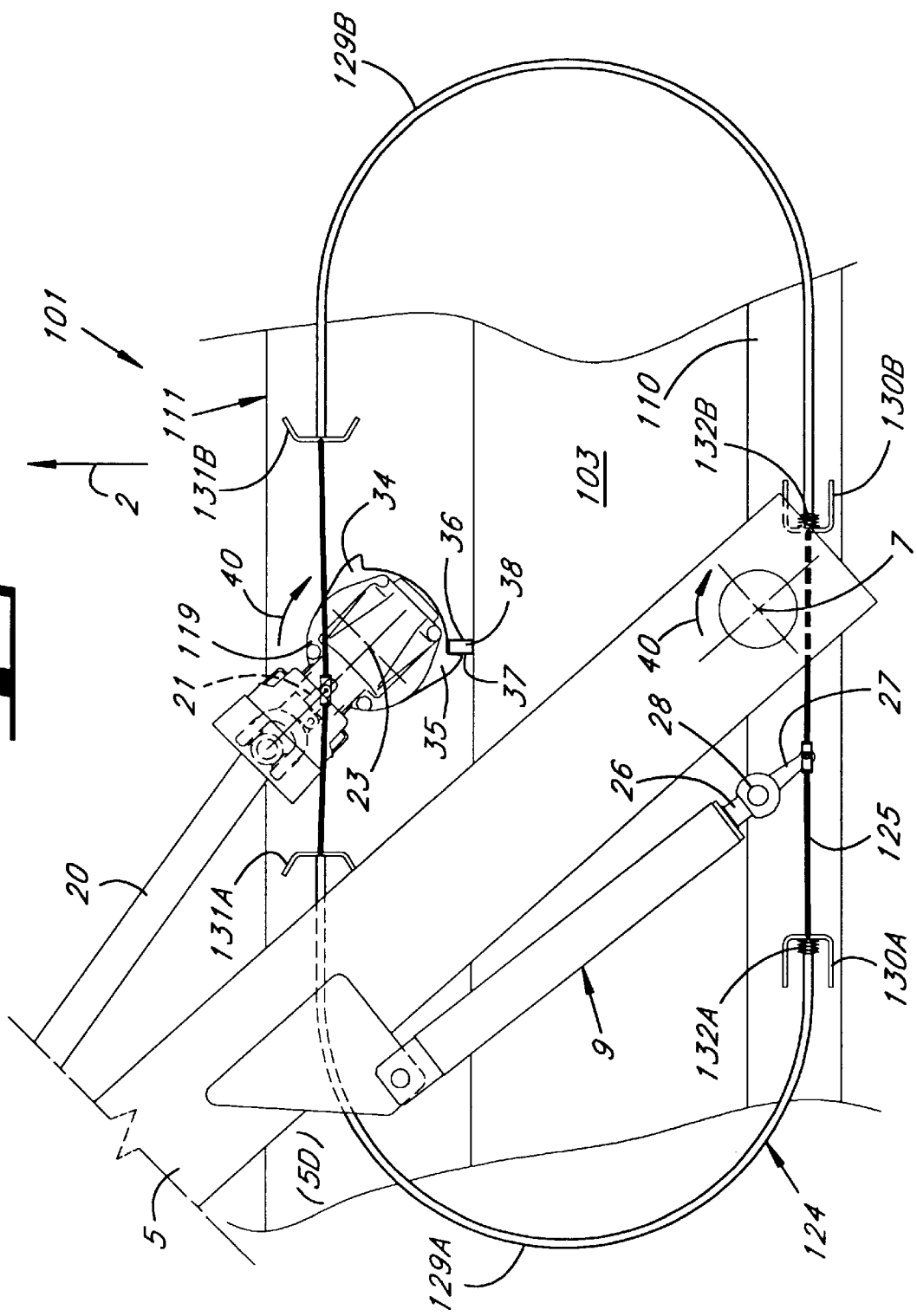
FIG. 5 shows the control mechanism seen in FIG. 4 in the right mowing position.

FIGS. 4 and 5 show a second embodiment of a control mechanism 124 equipping an agricultural machine 101. This mechanism comprises a single cable 125 constituting a closed loop that is connected to the operating cylinder 9 and to the gearbox 119. This cable 125 passes through two half-sleeves 129A, 129B each extending between two stops 130A, 131A, 130B, 131B and each compressed by a respective flexible element 132A, 132B. Stops 130A, 130B are part of the chassis 110 of the body 103, while the other stops 131A, 131B are part of the harvesting mechanism 111 of said body 103.

Positioning the gearbox 119 into the appropriate operating position is accomplished in the following manner.

To move from the mowing position on the left of the tractor vehicle (FIG. 4) to the mowing position on the right (FIG. 5), one shortens the operating cylinder 9 to cause the drawbar 5 to pivot in the direction 39 around the geometric axis 7 from working position 5G into working position 5D. In so doing, the extension 27 of the operating cylinder 9 pulls on the cable 125 toward the right causing the gearbox 119 to turn in the same direction 39 around the geometric axis 23. When the drawbar 5 reaches its working position 5D, the lug 35 of the gearbox 119 is in contact with the face 37 of the stop device 38. These flexible elements 132A, 132B allow the lug 35 to be in contact with the stop device 38 when the drawbar 5 reaches its position 5D.

To move from the mowing position on the right of the tractor vehicle (FIG. 5) to the mowing position on the left (FIG. 4), one extends the operating cylinder 9 in order to cause the drawbar 5 to pivot in the direction 40 around the geometric axis 7 from working position 5D into working position 5G. In so doing, the extension 27 of the operating cylinder 9 pulls the cable 125 toward the left causing the gearbox 119 to pivot in the same direction 40 around the geometric axis 23. When the drawbar 5 reaches its working position 5G, the lug 34 of the gearbox 119 is in contact with the face 36 of the stop device 38. Here, as well, the flexible elements 132A, 132B allow the lug 34 to be in contact with the stop device 38 when the drawbar 5 reaches its position 5G.

Figure 6:
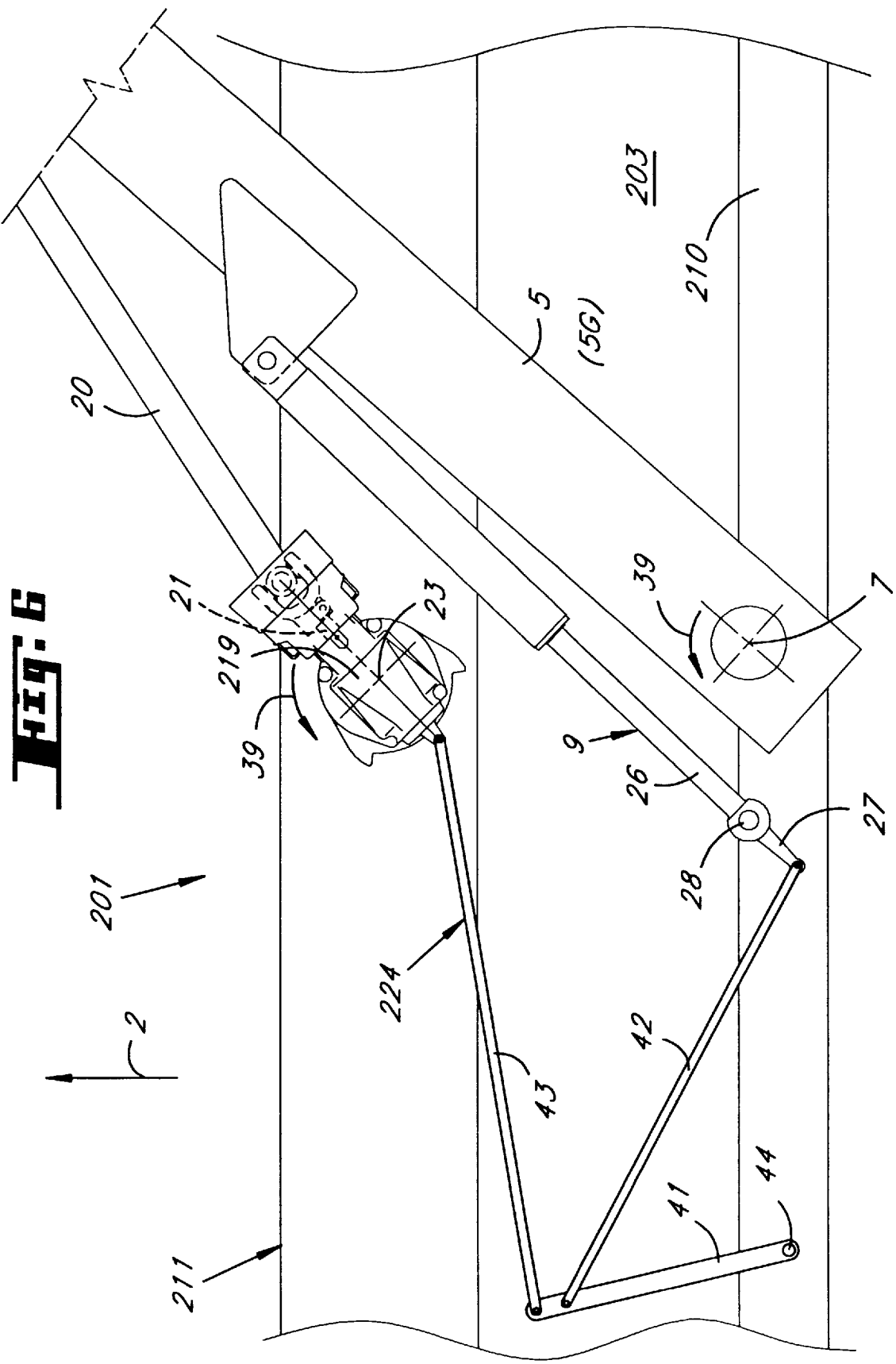
FIG. 6 shows a third embodiment of said control mechanism in the left mowing position.
Figure 7:
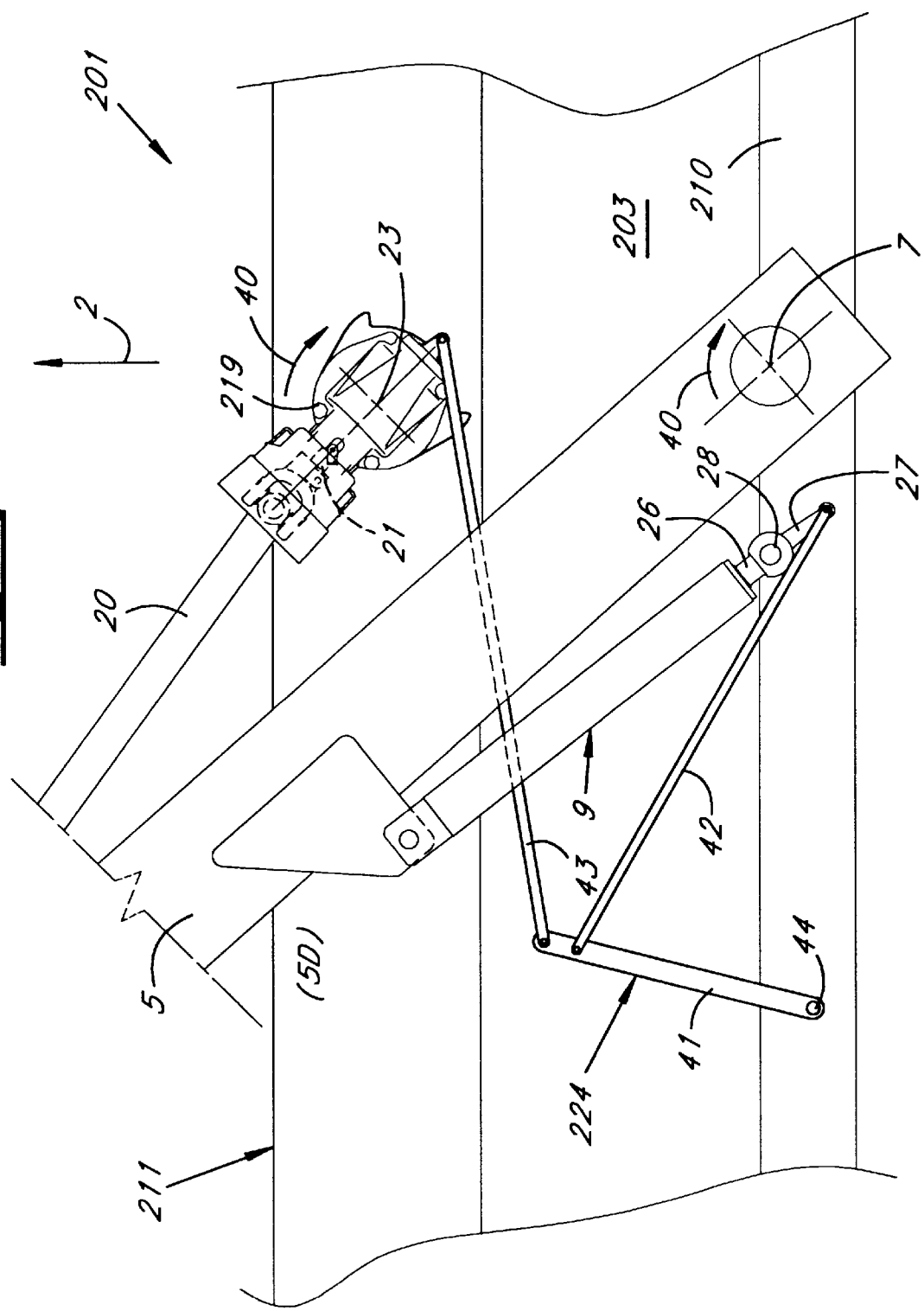
FIG. 7 shows the control mechanism of FIG. 6 in the right mowing position.

FIGS. 6 and 7 show a third embodiment of a control mechanism 224 equipping an agricultural machine 201. This consists of an articulated rod assembly that comprises a lever 41 and two rods 42, 43. In this embodiment, the lever 41 is connected at its rear end to the chassis 210 of the body 203 by means of a joint 44. The first rod 42 is positioned between the extension 27 of the rod 26 of the operating cylinder 9 and the middle part of said lever 41. Finally, the second rod 43 is positioned between the front end of the lever 41 and the rear portion of the gearbox 219.

Positioning the gearbox 219 into the appropriate operating position is accomplished in the following manner.

To move from the mowing position on the left of the tractor (FIG. 6) to the mowing position on the right (FIG. 7), one shortens the operating cylinder 9 in order to cause the drawbar 5 to pivot in the direction 39 around the geometric axis 7 from working position 5G into working position 5D. In so doing, the extension 27 of the operating cylinder 9 pulls on the first rod 42 and makes the lever 41 pivot to the right. When it pivots to the right, the lever 41 pushes on the second rod 43 causing the gearbox 219 to pivot in the same direction 39 around the geometric axis 23. When the drawbar 5 has reached its working position 5D, the gearbox 219 is also located in its appropriate operating position.

To move from the mowing position on the right of the tractor (FIG. 7) to the mowing position on the left (FIG. 6), one extends the operating cylinder 9 in order to cause the drawbar 5 to pivot in the direction 40 around the geometric axis 7 from working position 5D into working position 5G. In so doing, the extension 27 of the operating cylinder 9 pushes on the first rod 42 and causes the lever 41 to pivot to the left. When it pivots to the left, the lever 41 pulls on the second rod 43 causing the gearbox 219 to pivot in the same direction 40 around the geometric axis 23.

Figure 8:
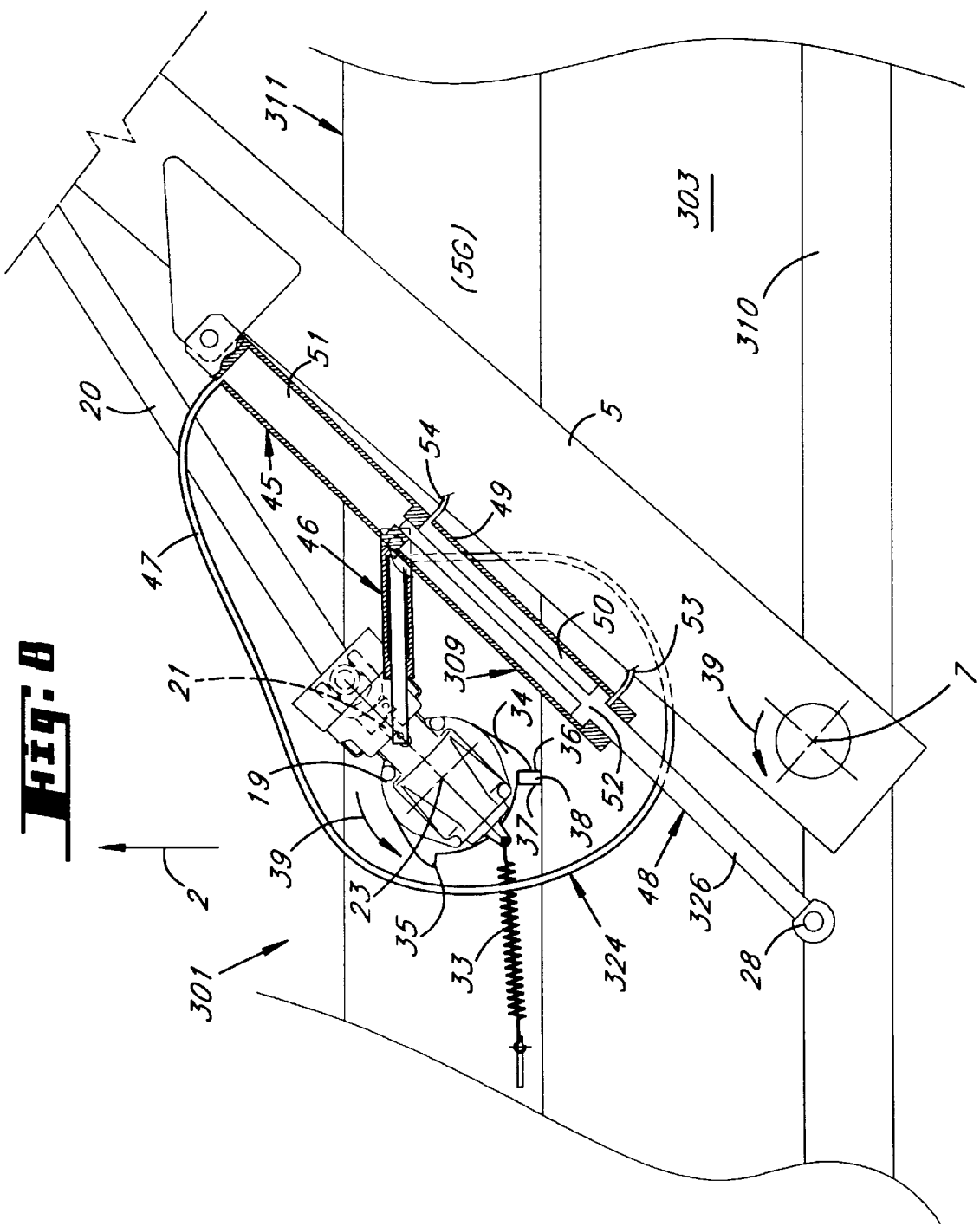
FIG. 8 shows a fourth embodiment of said control mechanism in the left mowing position.
Figure 9:
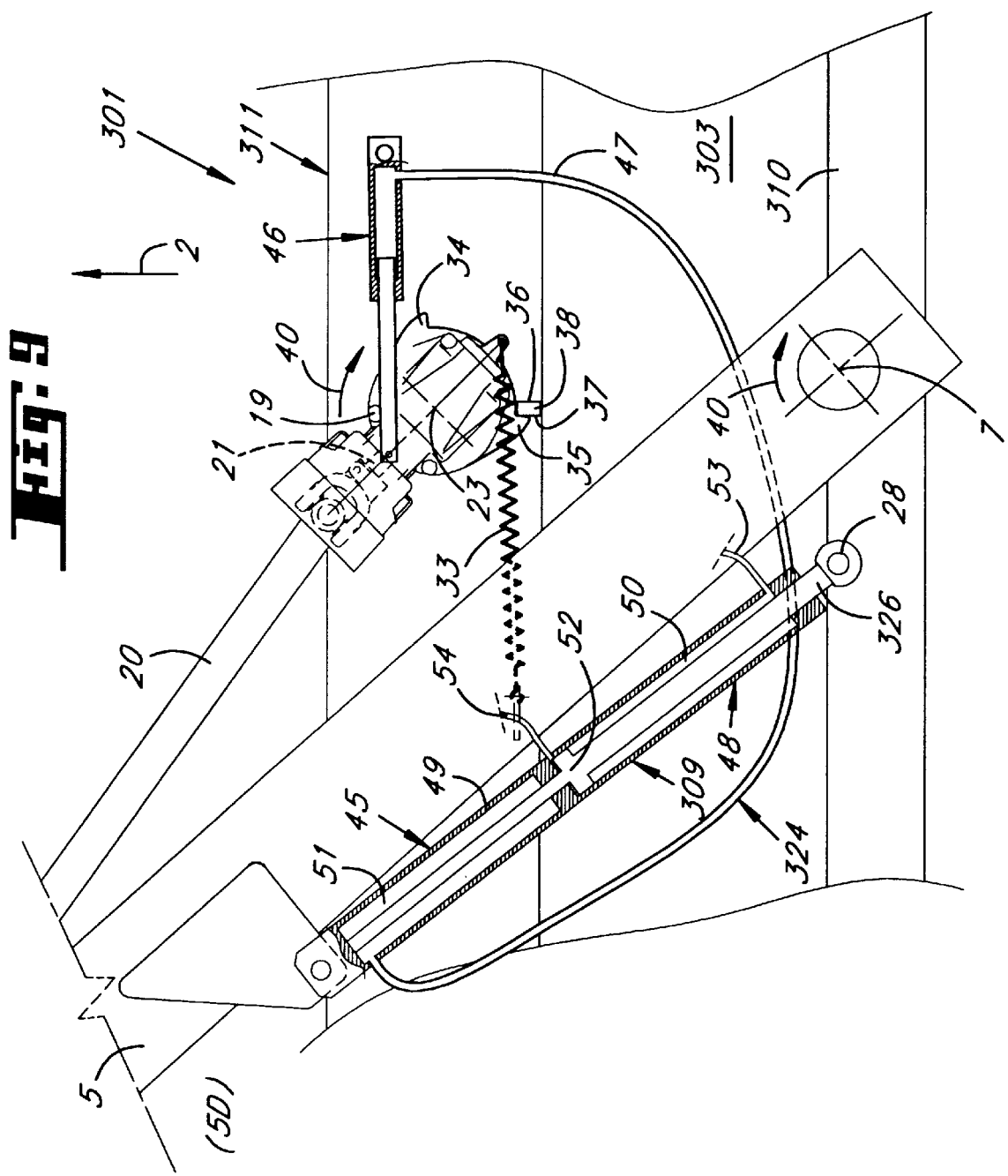
FIG. 9 shows the control mechanism of FIG. 8 in the right mowing position.

FIGS. 8 and 9 show a fourth embodiment of a control mechanism 324 equipping an agricultural machine 301. This mechanism comprises a first control cylinder 45 and a second control cylinder 46 connected in series by means of a conduit 47. In this embodiment, this first control cylinder 45 and this second control cylinder 46 are of the single-action type.

The first control cylinder 45 and the operating cylinder 309 form a unit 48 positioned between the drawbar 5 and the chassis 310 of the body 303. This unit 48 comprises a cylinder body 49 with an operating chamber 50 and a control chamber 51. In addition, this unit 48 comprises a rod 326 attached to the chassis 310 by its outside end and whose inside end is designed to extend into the control chamber 51 to form with it the first control cylinder 45. In its midsection, said rod 326 also comprises an operating piston 52 that extends into the operating chamber 50 in order to form the operating cylinder 309 with it.

The second control cylinder 46 is positioned between the harvesting mechanism 311 and the gearbox 19.

Finally, the control mechanism 324 also comprises a flexible control component 33 installed between the harvesting mechanism 311 and the gearbox 19.

Positioning the gearbox 19 into the appropriate operating position is accomplished in the following manner.

To move from the mowing position on the left of the tractor (FIG. 8) to the mowing position on the right (FIG. 9), one shortens the operating cylinder 309 by injecting fluid through the conduit 53 to cause the drawbar 5 to pivot in the direction 39 around the geometric axis 7 from working position 5G into working position 5D. In so doing, the inside end of the rod 326 plunges more and more deeply into the control chamber 51 and expels the fluid contained therein into the second control cylinder 46 through the conduit 47. As a result, the second control cylinder 46 extends and causes the gearbox 19 to pivot in the same direction 39 around the geometric axis 23. When the drawbar 5 reaches its working position 5D, the lug 35 of the gearbox 19 is in contact with the face 37 of the stop device 38. In parallel fashion, pivoting the gearbox 19 in the direction 39 stresses the flexible control component 33, which thereby accumulates energy.

To move from the mowing position on the right of the tractor vehicle (FIG. 9) to the mowing position on the left (FIG. 8), one extends the operating cylinder 309 by injecting fluid via the conduit 54 to cause the drawbar 5 to pivot in the direction 40 around the geometric axis 7 from working position 5D into working position 5G. In so doing, the inside end of the rod 326 withdraws progressively from the control chamber 51 and aspirates the fluid contained in the second control cylinder 46. The gearbox 19 then pivots in the same direction 40 around the geometric axis 23 under the combined effect of the shortening of the second control cylinder 46 and of the flexible control component 33. When the drawbar 5 reaches its working position 5G, the lug 34 of the gearbox 19 is in contact with the face 36 of the stop device 38.

In parallel fashion, it is also provided that the reaction generated by the driving torque applied to the gearbox 19 tends to cause the gearbox 19 to pivot in the direction 40.

FIGS. 10 and 11 show a fifth embodiment of a control mechanism 424 equipping an agricultural machine 401. This mechanism comprises a first control cylinder 445 and a second control cylinder 446 connected in a closed circuit by means of two conduits 47, 55. In this embodiment, the first control cylinder 445 and the second control cylinder 446 are of the dual-action type.

Here, too, the first control cylinder 445 and the operating cylinder 309 form a unit 448 positioned between the drawbar 5 and the chassis 310 of the body 403. This unit 448 comprises a cylinder body 449 with an operating chamber 50 and a control chamber 451. This unit 448 also comprises a rod 426 joined to the chassis 310 by its outside end and whose inside end comprises a control piston 56 which extends into the control chamber 451 to form with it the first control cylinder 445. In its mid-section, said rod 426 also comprises the operating piston 52 that extends into the operating chamber 50 to form with it the operating cylinder 309.

The second control cylinder 446 is connected between the harvesting mechanism 411 and the gearbox 219. Positioning the gearbox 219 into the appropriate operating position is accomplished in the following manner.

To move from the mowing position on the left of the tractor (FIG. 10) to the mowing position on the right (FIG. 11), one shortens the operating cylinder 309 by injecting fluid via the conduit 53 to cause the drawbar 5 to pivot in the direction 39 around the geometric axis 7 from working position 5G into working position 5D. In so doing, the inside end of the rod 426 and the control piston 56 plunge more and more deeply into the control chamber 451. The control piston 56 then expels the fluid into the second control cylinder 446 through the conduit 47. In parallel fashion, fluid contained in the second control cylinder 446 is pumped into the first control cylinder 445 via the conduit 55. As a result, the second control cylinder 446 extends and causes the gearbox 219 to pivot in the same direction 39 around the geometric axis 23.

To move from the mowing position on the right of the tractor (FIG. 11) to the mowing position on the left (FIG. 10), one extends the operating cylinder 309 by injecting fluid via the conduit 54 in order to cause the drawbar 5 to pivot in the direction 40 around the geometric axis 7 from working position 5D into working position 5G. In so doing, the inside end of the rod 426 and the control piston 56 withdraw progressively from the control chamber 451. The control piston 56 then expels fluid into the second control cylinder 446 through the conduit 55. In parallel fashion, fluid contained in the second control cylinder 446 is pumped into the first control cylinder 445 via the conduit 47. As a result, the second control cylinder 446 shortens and causes the gearbox 219 to pivot in the same direction 40 around the geometric axis 23.

A stop device 38 can be provided in all the embodiments that have just been described Said stop device 38 may, moreover, be embodied as a flexible stop such as a rubber stop, for example.

Various modifications remain possible without departing from the protective scope delimited by the claims Thus one can modify the constitution of the various elements described. One can also replace these various elements with technical equivalents Finally, one can make all the kinematic inversions technically possible.

What is claimed as new and desired to be secured by Letters Patent of the United States is:

1. An agricultural machine comprising:

a body equipped with at least one working component;

a connecting mechanism allowing connection of said agricultural machine to a tractor vehicle, said connecting mechanism being connected to said body via a first joint with an upwardly directed axis;

an operating device for pivoting the connecting mechanism with respect to said body around the axis of said first joint, said connecting mechanism being positionable in at least two working positions;

transmission elements for powering said at least one working component, said transmission elements including at least one gearbox connected to the body by a second joint with an upwardly directed axis; and a control mechanism for pivoting said gearbox with respect to said body around the second axis of said second joint, said gearbox being positionable in operating positions corresponding to said working positions of the connecting mechanism;

wherein said operating devices comprises:

a first control cylinder positioned between the connecting mechanism and the body; and wherein said control mechanism comprises:

a second control cylinder positioned between the body and the gearbox and connected in series with the first control cylinder.

2. An agricultural machine in accordance with claim 1 wherein:

the first control cylinder and the second control cylinder are of the single-effect type, said second control cylinder controlling the pivoting of the gearbox in a first direction; and the control mechanism additionally comprises a flexible control component installed between the body and the gearbox and controlling the pivoting of said gearbox in a second direction.

3. An agricultural machine in accordance with claim 2 wherein a reaction generated by the driving torque applied to the gearbox tends to cause the gearbox to pivot in the second direction.

4. An agricultural machine in accordance with claim 1 wherein the first control cylinder and the second control cylinder are of the dual-action type and are connected in a closed circuit.

5. An agricultural machine in accordance with claim 1 wherein the operating device comprises an operating cylinder positioned between the connecting mechanism and the body.

6. An agricultural machine in accordance with claim 5 wherein:

the first control cylinder and the second control cylinder are of the single-action type, said second control cylinder controlling the pivoting of the gearbox in a first direction;

the control mechanism additionally comprises a flexible control component installed between the body and the gearbox that controls pivoting of said gearbox in a second direction;

the operating cylinder and the first control cylinder form a unit positioned between the connecting mechanism and the body;

said unit comprises a cylinder body equipped with an operating chamber and a control chamber, and a rod equipped with an operating piston that extends into the operating chamber so as to form with said operating chamber the operating cylinder and wherein said rod extends into the control chamber to form with said control chamber the first control cylinder.

7. An agricultural machine in accordance with claim 5 wherein:

the first control cylinder and the second control cylinder are of the dual-action type and are connected in a closed circuit;

the operating cylinder and the first control cylinder form a unit positioned between the connecting mechanism and the body;

said unit comprising a cylinder body equipped with an operating chamber and a control chamber, and a rod equipped with an operating piston extending into the operating chamber so as to form with it the operating cylinder, said rod comprising additionally a control piston which extends into the control chamber to form with it the first control cylinder.

8. An agricultural machine in accordance with claim 5 wherein the operating cylinder is of the dual-action type.

9. An agricultural machine in accordance with claim 1 wherein the gearbox is positionable in two operating positions, each of which is defined by a respective stop installed on the body.

10. An agricultural machine in accordance with claim 1 wherein the transmission elements comprise at least one telescopic transmission shaft with universal joints connected to the input shaft of the gearbox.

11. An agricultural machine in accordance with claim 10 wherein said one transmission shaft or at least one of said transmission shafts is supported by the connecting mechanism.

12. An agricultural machine in accordance with claim 1 wherein the transmission elements receive movement of the power take-off shaft of the tractor to which the machine is connected.

13. An agricultural machine in accordance with claim 1 wherein:

the body is supported on the ground by means of at least one wheel; and the connecting mechanism comprises a drawbar connected to the middle section of said body.

14. An agricultural machine in accordance with claim 1 wherein the body comprises a chassis to which the connecting mechanism is connected and in which the at least one working component is suspended by means of a suspension device so as to be moveable with respect to the chassis in order to adapt to the ground terrain.

* * * * *